United States Patent
Kanzow et al.

(10) Patent No.: US 10,060,506 B2
(45) Date of Patent: Aug. 28, 2018

(54) FLEXURALLY ELASTIC DRIVE BELT

(75) Inventors: Henning Kanzow, Hannover (DE);
Marko Schleicher, Seelze (DE);
Reinhard Teves, Seelze (DE);
Claus-Lüder Mahnken, Ahausen (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 756 days.

(21) Appl. No.: 12/659,281

(22) Filed: Mar. 3, 2010

(65) Prior Publication Data
US 2010/0240482 A1 Sep. 23, 2010

Related U.S. Application Data

(63) Continuation of application No. PCT/EP2008/057261, filed on Jun. 11, 2008.

(51) Int. Cl.
*F16G 1/04* (2006.01)
*F16G 5/20* (2006.01)
*F16G 5/08* (2006.01)

(52) U.S. Cl.
CPC ........... *F16G 5/20* (2013.01); *F16G 5/08* (2013.01)

(58) Field of Classification Search
CPC ... B29C 66/71; F16G 5/20; F16G 1/28; F16G 5/06; F16G 5/08
USPC .......... 474/237–260, 202, 204, 205
See application file for complete search history.

(56) References Cited

U.S. PATENT DOCUMENTS

| | | | |
|---|---|---|---|
| 3,566,706 A * | 3/1971 | Fix .................................. | 474/265 |
| 3,981,206 A * | 9/1976 | Miranti et al. ................ | 474/238 |
| 4,169,393 A * | 10/1979 | Wetzel et al. ................. | 474/205 |
| 4,504,258 A * | 3/1985 | Tanaka et al. ................. | 474/263 |
| 4,767,389 A * | 8/1988 | Habegger et al. ............ | 474/266 |
| 4,931,118 A * | 6/1990 | Kitahama et al. ............ | 156/138 |
| 5,112,282 A * | 5/1992 | Patterson ....................... | 474/260 |
| 5,344,369 A * | 9/1994 | Kitahama et al. ............ | 474/253 |
| 5,405,299 A * | 4/1995 | Kubo et al. .................... | 474/205 |
| 5,413,538 A * | 5/1995 | Mishima ....................... | 474/263 |

(Continued)

FOREIGN PATENT DOCUMENTS

| | | |
|---|---|---|
| DE | 38 23 157 | 2/1990 |
| DE | 44 00 434 | 7/1995 |

(Continued)

OTHER PUBLICATIONS

Office Action dated Oct. 10, 2017 of Indian Patent Office of corresponding Indian patent application No. 760/DELNP/2010.

*Primary Examiner* — Henry Y Liu
(74) *Attorney, Agent, or Firm* — Walter Ottesen, P.A.

(57) ABSTRACT

A flexurally elastic drive belt (1) has a cover layer (2), a reinforcement layer (3) formed of individual cords (4) and a substructure (5). The substructure can include ribs (6) and grooves (7). The drive belt is further provided with a textile overlay on the working side (8) thereof that is susceptible to wear. The textile overlay (10; section B of FIG. 1) of the drive belt (1) combines a very durable resistance to wear and a noise attenuation especially for wet noises. This is achieved in that the overlay has, in a state in advance of fabrication and vulcanization, an elongation at tear of at least 30% in the longitudinal direction and of at least 100% in the transverse direction and is made of a textile material including staple fibers in a proportion in terms of quantity of at least 30% by weight.

42 Claims, 1 Drawing Sheet

(56) References Cited

U.S. PATENT DOCUMENTS

| | | | |
|---|---|---|---|
| 5,417,618 A | | 5/1995 | Osako et al. |
| 5,429,555 A | * | 7/1995 | Beckh ............................ 474/267 |
| 6,056,656 A | * | 5/2000 | Kitano et al. .................. 474/268 |
| 6,296,588 B1 | * | 10/2001 | Ciemniecki et al. ......... 474/268 |
| 6,409,621 B1 | * | 6/2002 | Billups et al. ................. 474/263 |
| 6,419,775 B1 | | 7/2002 | Gibson et al. |
| 6,461,264 B1 | * | 10/2002 | Lofgren ........................ 474/260 |
| 6,464,607 B1 | | 10/2002 | Rosenboom et al. |
| 6,572,505 B1 | * | 6/2003 | Knutson ........................ 474/260 |
| 6,770,004 B1 | * | 8/2004 | Lofgren et al. ............... 474/266 |
| 7,128,674 B2 | | 10/2006 | Teves et al. |
| 2003/0078125 A1 | * | 4/2003 | Knutson ............... B29D 29/08 <br> 474/260 |
| 2004/0121869 A1 | | 6/2004 | Becella |
| 2004/0152551 A1 | | 8/2004 | Okuno et al. |
| 2007/0240658 A1 | | 10/2007 | Baldovino et al. |
| 2008/0032837 A1 | | 2/2008 | Unruh et al. |
| 2008/0261739 A1 | | 10/2008 | Kanzow et al. |
| 2009/0227406 A1 | * | 9/2009 | Wu ....................... C08G 18/12 <br> 474/238 |

FOREIGN PATENT DOCUMENTS

| | | |
|---|---|---|
| EP | 0 599 145 | 6/1994 |
| WO | WO 00/29762 | 5/2000 |

\* cited by examiner

FLEXURALLY ELASTIC DRIVE BELT

CROSS REFERENCE TO RELATED APPLICATIONS

This application is a continuation application of international patent application PCT/EP 2008/057261, filed Jun. 11, 2008, designating the United States and claiming priority from German application 10 2007 042 917.9, filed Sep. 8, 2007, and the entire content of both applications is incorporated herein by reference.

FIELD OF THE INVENTION

The invention relates to a flexurally elastic drive belt (power transmission belt), particularly a V-ribbed belt, having a textile overlay on the working side thereof that is susceptible to wear. The drive belt is provided especially with an embedded tension load-bearing carrier or reinforcement.

BACKGROUND OF THE INVENTION

With regard to the prior art of drive belts, which may be formed as flat belts, V belts, V-ribbed belts and toothed belts, the V-ribbed belts being of particular significance, reference is made particularly to the following patent literature: German patent publications 3,823,157 A1 and 44 00 434 A1; European patent publications 0,599,145 B1 and 1,129,308 B1; U.S. Pat. Nos. 7,128,674; 6,419,775; 6,464,607; 5,413,538 and 3,981,206; and, United States patent application publications 2008/0261739 A1; 2007/0240658 A1; and, 2008/0032837 A1.

German patent publication 38 23 157 A1 describes flocking V-ribbed belts with cotton or aramid on the working side that is susceptible to wear. It has been found that such flocking concepts are not very durable in the case of some engines. Although this type of coating reduces noise problems, in the case of some engines the noise level is still too high, particularly in the case of noise problems when wet.

Therefore, U.S. Pat. No. 3,981,206 proposes a solution whereby the V-ribbed belt is provided with a knit textile overlay of synthetic plastic materials, particularly yarns of two synthetic plastic materials. Here, too, the occurrence of noise when wet is disadvantageous.

From the viewpoint of V-ribbed belts, United States patent application publication 2008/0261739 A1 discloses a more recent development. For, the purpose of improving noise behavior, the textile overlay comprises a knit of two different yarns in the form of different filament modules, particularly in the combination of polyamide (PA) and polyurethane (PU, for example Elasthane). In spite of a considerable increase in resistance, and consequently in the performance in comparison with the state of the art of V-ribbed belts referred to above, here too noises occur in the wet, albeit no longer to the extent previously known.

United States patent application publication 2008/0032837 discloses a toothed belt with a textile overlay of woven fabric which is also referred to here as a tooth overlay. The fabric is a blended fabric based on a polyamide fabric in which the weft threads are entirely or partly replaced in the peripheral/longitudinal direction of the belt by threads of polyether ether ketone (PEEK), polyimide (PI) and/or meta-aramid or are modified with PEEK, PI and/or meta-aramid. In this way, the heat resistance of the toothed belt is increased and a malfunction prevented.

United States patent application publication 2007/0240658 likewise describes a toothed belt with a textile overlay, particularly based on polyamide (for example PA66), which however is coated with a fluoropolymer (for example PTFE), particularly in combination with an additional adhesive layer. The object here is to improve the oil resistance of the toothed belt.

German patent publication 44 00 434 A1 and U.S. Pat. No. 6,419,775 disclose drive belts having a textile overlay in the form of a reinforcing fabric which is likewise coated with a fluoropolymer (for example, PTFE). The object here is to provide a belt surface that has favorable antifriction properties.

German patent publication 44 00 434 A1, European patent publications 0,599,145 B1 and 1,129,308 B1 and U.S. Pat. Nos. 7,128,674; 6,464,607 and 5,413,538 are directed to the technological field of drive belts, that is, in the context of elastomeric materials (for example, HNBR), embedded tension load-bearing elements (for example, steel, polyamide or polyester cords), the use of fibers (for example, aramid or cotton fibers) and the types of drive belts.

SUMMARY OF THE INVENTION

In the context of a further development, particularly of the prior development disclosed in United States patent application publication 2008/0261739 A1, it is an object of the invention to provide a flexurally elastic drive belt, particularly a V-ribbed belt, that is characterized by a combination of both a very durable protection against wear and noise suppression, particularly with respect to noises when wetness is present.

The above object is achieved in accordance with a feature of the invention in that the textile overlay has, in the state before fabrication and before vulcanization, an elongation at tear in the longitudinal direction of at least 30% and in the transverse direction of at least 100%; and, in that the textile overlay includes a textile material which comprises staple fibers in a proportion in terms of quantity of at least 30% by weight.

For an explanation of staple fibers, also known as spinnable fibers, in terms of textile technology, reference is made to Römpps Chemie-Lexikon (8th edition, volume 5, 1987).

With regard to the textile overlay, the following configurational possibilities are of advantage:
(i) the elongation at tear in the longitudinal direction is at least 70%, particularly at least 110%, particularly at least 130% and optimally at least 150%;
(ii) the elongation at tear in the transverse direction is at least 110%, particularly at least 130%, optimally at least 150%;
(iii) the proportion of staple fibers in terms of quantity is at least 50% by weight, particularly at least 70% by weight. Tests have shown in this respect that particularly good results are achieved with a proportion of staple fibers of 90% by weight;
(iv) the staple fibers consist of cotton, aramid or cellulose. Cellulose is in this case used in the form of hemp, flax or sisal or in the form of blends of these types of cellulose. Staple fiber blends, for example of cotton and aramid, may also be used. A series of tests has shown in this respect that, if cotton is used, the best results are achieved with regard to the suppression of noises in the wet. The noise test was performed on a common-rail motor with a V-ribbed belt drive comprising four pulleys, with and without water being added and with and without a decrease in power at the generator;

(v) the textile material takes the form of yarns or twisted yarns. In the case of twisted yarns, twisted union yarns, for example a twisted union yarn of cotton and aramid, may also be used; and, (vi) the textile material comprises a sheet-like structure, particularly in the form of a knitted or woven fabric that is additionally provided with an elastic textile component. The elastic textile component is particularly polyurethane (PU). In this connection, the sheet-like structure particularly comprises cotton/PU, aramid/PU or cellulose/PU. In this way, an advantageous elasticity is achieved with high elongation at break in the longitudinal and transverse directions. A series of tests has shown here too that, if a sheet-like structure of cotton/PU is used, the best results are achieved with regard to the suppression of noises in the wet. With regard to the noise test, reference is made to the aforementioned conditions.

The aforementioned elongations of the textile overlay (fabric) are of central significance and two possibilities for measuring elongation are presented below:

(a) if the elongation of a sheet-like structure is measured on a measuring strip, this strip constricts. The textile overlay in the drive belt does not have this possibility, since the fabric is firmly vulcanized-in on the surface of the belt. Therefore, the measurement of the elongation in the particular direction must be carried out on the unvulcanized fabric in such a way that the transverse direction in relation to the cross member is at the same time kept constant. This can take place for example with a clamping frame that is movable in the direction of the cross member.

(b) an alternative suitable option is to fix a textile overlay in a rectangular clamping frame and stretch the middle of the sheet-like structure perpendicularly thereto with a ball or point. The elongations in the longitudinal and transverse directions can be calculated from the stretched displacement with the aid of geometric considerations.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
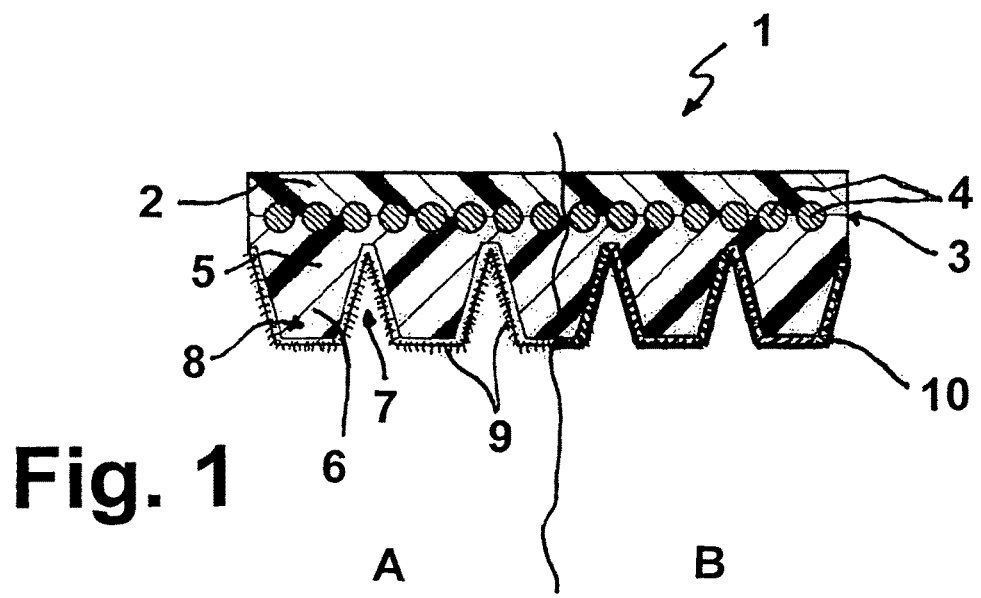
FIG. 1 shows, in the left-hand portion, a cross section of a V-ribbed belt according to the prior art (section A) and, in the right-hand portion, an embodiment according to the invention (section B); and, FIG. 2 is a perspective view showing details of a V-ribbed belt according to another embodiment of the invention.

FIG. 1 shows a drive belt 1 in the form of a V-ribbed belt having a top layer 2, a reinforcement layer 3 with tension load-bearing carriers 4 arranged in parallel and running in the longitudinal direction, as well as having a substructure 5. The reinforcement in the form of tension load-bearing carriers is particularly individual cords, for example, steel, polyamide or polyester. The substructure 5 has a V-ribbed structure formed by ribs 6 and grooves 7.

The elasticity of the drive belt 1 or V-ribbed belt is effected by an elastomeric material for the top layer 2 and the substructure 5. The basis for the elastomeric materials is in this case formed particularly by an ethylene-propylene copolymer (EPM), an ethylene-propylene-diene copolymer (EPDM) or polychloroprene (CR).

On its working side 8 that is susceptible to wear, which is also referred to as the power transmission zone, the drive belt 1 or V-ribbed belt according to the prior art (section A) is provided with flocking 9, for example, with a cotton flock. For details, reference is made to German patent publication 38 23 157 A1.

In the case of the drive belt 1 or V-ribbed belt according to the invention (section B), this flocking is replaced by a textile overlay 10 which:

(i) has, in the state before fabrication and before vulcanization, an elongation at tear in the longitudinal direction of at least 30% and in the transverse direction of at least 100%; and, (ii) comprises a textile material which includes staple fibers in a proportion in terms of quantity of at least 30% by weight.

With such a textile overlay, an effective combination of very durable protection from wear and a noise suppression, particularly in the case of noises when there is wetness, is achieved.

With regard to the advantageous configurational possibilities for the textile overlay 10, reference is made to the above-described embodiments and the following features of the invention:

(a) the elongation at tear in the longitudinal direction is at least 70%;
(b) the elongation at tear in the longitudinal and transverse directions is at least 110%;
(c) the elongation at tear in the longitudinal and transverse directions is at least 130%;
(d) the elongation at tear in the longitudinal direction is at least 150%;
(e) the proportion of staple fibers in terms of quantity is at least 50% by weight;
(f) the proportion of staple fibers in terms of quantity is at least 70% by weight;
(g) the staple fibers are of cotton;
(h) the staple fibers are of aramid;
(i) the staple fibers are of cellulose;
(j) cellulose is used in the form of hemp, flax or sisal or in the form of blends of these types of cellulose;
(k) the textile material takes the form of yarns;
(l) the textile material takes the form of twisted yarns;
(m) the textile material comprises a sheet-like structure, particularly in the form of a knitted or woven fabric that is additionally provided with an elastic textile component; and, the textile material is selected from the group consisting of yarns and twisted yarns;
(n) the sheet-like structure comprises cotton and the elastic textile component; and, the staple fibers comprise cotton;
(o) the sheet-like structure comprises aramid and the elastic textile component; and, the staple fibers comprise aramid;
(p) the sheet-like structure comprises cellulose and the elastic textile component; and, the staple fibers comprise cellulose; and,
(q) the elastic textile component comprises polyurethane (PU).

Figure 2:
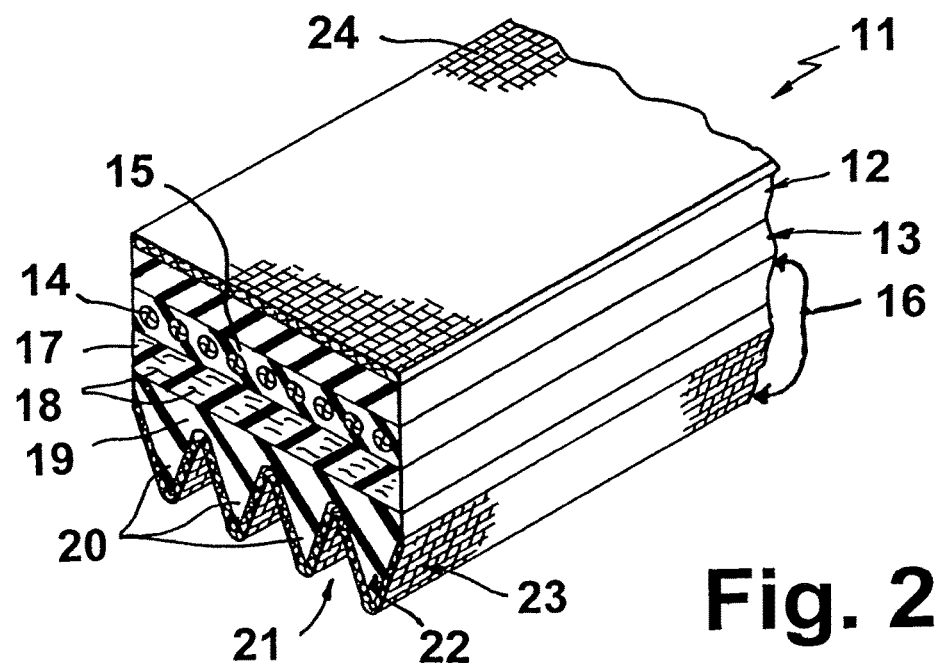

FIG. 2 shows a further drive belt 11 which is likewise in the form of a V-ribbed belt. The V-ribbed belt comprises a top layer 12, a reinforcement layer 13 and a substructure 16. Here, the strengthening support layer is formed by tension load-bearing elements 14 in the form of individual cords and by an additional elastic embedding mixture 15. The substructure per se comprises an elastic intermediate layer 17, which is reinforced with fibers 18, for example aramid fibers or cotton fibers, as well as a V-ribbed zone 19, formed by ribs 20 and grooves 21.

Like the top layer 12 and the substructure 16, the embedding mixture 15 and the intermediate layer 17 can comprise an elastomeric material based on EPM, EPDM or CR.

The drive belt 11 or V-ribbed belt is likewise provided on its working side 22, that is susceptible to wear, with a textile overlay 23, which has already been presented in more detail in connection with the description of FIG. 1.

The textile overlay may be provided or impregnated with an adhesive, more specifically, by forming an optimum adhesive bond between the V-ribbed zone of the substructure and the textile overlay. The adhesive may be a rubber blend, for example based on EPDM, with which tackifying substances (for example resins) are admixed. Adhesive pastes or adhesive cements can also be used.

The textile overlay may be uncoated or coated. The coating is based particularly on a thin sealing composition, which is comprised particularly of an elastomeric material, particularly based on a fluoroelastomer.

This allows, for example, the oil resistance of the drive belt or V-ribbed belt to be increased.

The textile layer can, furthermore, be provided or impregnated with a polymer solution, which for example contains a dry lubricant (for example, PTFE). More specifically, this lowers the coefficient of friction in accordance with SAE standard J2432 (January 2000).

The textile overlay is, particularly, of a seamless configuration, for example in the form of a tubular knit.

The textile overlay and/or the adhesive and/or the polymer solution can, moreover, also be configured to be electrically conductive by admixing electrically conducting carbon black, graphite, metal particles or nanofibers, for example, based on carbon.

In the embodiment of FIG. 2, the top layer 12 is also provided with a backing fabric 24. Embodiments according to the prior art cited initially herein may be used here. The backing fabric can, however, also be replaced by a textile overlay in accordance with the invention.

It is understood that the foregoing description is that of the preferred embodiments of the invention and that various changes and modifications may be made thereto without departing from the spirit and scope of the invention as defined in the appended claims.

LIST OF DESIGNATIONS

Part of the Description 1 drive belt or V-ribbed belt
2 top layer
3 reinforcement layer
4 tension load-bearing elements in the form of individual cords
5 substructure
6 ribs
7 grooves
8 working side that is susceptible to wear (power transmission zone)
9 flocking (section A)
10 textile overlay (section B)
11 drive belt or V-ribbed belt
12 top layer
13 reinforcement layer
14 tension load-bearing elements in the form of individual cords
15 embedding mixture
16 substructure
17 intermediate layer
18 fiber reinforcement
19 V-ribbed zone
20 ribs
21 grooves
22 working side that is susceptible to wear (power transmission zone)
23 textile overlay
24 backing fabric

What is claimed is:

1. A flexurally elastic drive belt comprising:
a belt body defining a longitudinal direction and having a work side subject to wear during operational use of said drive belt;
a textile overlay disposed on said work side of said drive belt;
in a state in advance of fabrication and in advance of vulcanization, said textile overlay having an elongation at tear in said longitudinal direction of at least 30% and an elongation at tear in a transverse direction of at least 100%;
said textile overlay being made of a textile material which includes staple fibers in a proportion in terms of quantity of at least 70% by weight;
said textile overlay comprises a sheet-like structure in the form of a woven fabric;
wherein said staple fibers comprise: (i) cellulose, or (ii) cotton and cellulose,
wherein the sheet-like structure is additionally provided with an elastic textile component,
wherein the textile material is selected from the group consisting of yarns and twisted yarns,
wherein the elastic textile component consists of polyurethane (PU), and
wherein cellulose is in the form of hemp, flax, or sisal or in the form of blends of two or more of hemp, flax, and sisal.

2. The drive belt of claim 1, further comprising a reinforcement embedded in said body to take up tension loads.

3. The drive belt of claim 1, wherein the elongation at tear in said longitudinal direction is at least 70%.

4. The drive belt of claim 1, wherein the elongation at tear in said longitudinal and transverse directions is at least 110%.

5. The drive belt of claim 1, wherein the elongation at tear in said longitudinal and transverse directions is at least 130%.

6. The drive belt of claim 1, wherein the elongation at tear in said longitudinal direction is at least 150%.

7. The drive belt of claim 1, wherein the textile material takes the form of yarns.

8. The drive belt of claim 1, wherein the textile material takes the form of twisted yarns.

9. The drive belt of claim 1, wherein the sheet-like structure comprises cellulose and the elastic textile component and said staple fibers comprise cellulose.

10. The drive belt of claim 1, wherein said drive belt comprises an elastomeric material based on an ethylene-propylene copolymer (EPM) or an ethylene-propylene-diene copolymer (EPDM).

11. The drive belt of claim 1, further comprising an elastomeric material based on polychloroprene (CR).

12. The drive belt of claim 1, wherein the textile overlay is provided or impregnated with an adhesive.

13. The drive belt of claim 1, wherein the textile overlay is uncoated.

14. The drive belt of claim 1, wherein the textile overlay is coated.

15. The drive belt of claim 14, wherein the coating of the textile overlay is based on a sealing composition.

16. The drive belt of claim 15, wherein the sealing composition consists of an elastomeric material.

17. The drive belt of claim 16, wherein the sealing composition consists of a fluoroelastomer.

18. The drive belt of claim 1, wherein the textile overlay is provided or impregnated with a polymer solution.

19. The drive belt of claim 1, wherein the textile overlay is of a seamless configuration.

20. The drive belt of claim 1, wherein the textile overlay is impregnated with an electrically conductive adhesive or an electrically conductive polymer solution.

21. A flexurally elastic V-ribbed drive belt comprising:
a belt body defining a longitudinal direction and having a ribbed work side subject to wear during operational use of said drive belt;
a textile overlay disposed on said ribbed work side;
in a state in advance of fabrication and in advance of vulcanization, said textile overlay having an elongation at tear in said longitudinal direction of at least 30% and an elongation at tear in a transverse direction of at least 100%;
said textile overlay being made of a textile material which includes staple fibers in a proportion in terms of quantity of at least 70% by weight;
said textile overlay comprises a sheet-like structure in the form of a woven fabric;
wherein the staple fibers comprise: (i) cellulose, or (ii) cotton and cellulose,
wherein the sheet-like structure is additionally provided with an elastic textile component,
wherein the textile material is selected from the group consisting of yarns and twisted yarns,
wherein the elastic textile component consists of polyurethane (PU), and
wherein cellulose is used in the form of hemp, flax, or sisal or in the form of blends of two or more of hemp, flax, and sisal.

22. The drive belt of claim 21, further comprising a reinforcement embedded in said body to take up tension loads.

23. The drive belt of claim 21, wherein the elongation at tear in said longitudinal direction is at least 70%.

24. The drive belt of claim 21, wherein the elongation at tear in said longitudinal and transverse directions is at least 110%.

25. The drive belt of claim 21, wherein the elongation at tear in said longitudinal and transverse directions is at least 130%.

26. The drive belt of claim 21, wherein the elongation at tear in said longitudinal direction is at least 150%.

27. The drive belt of claim 21, wherein the textile material takes the form of yarns.

28. The drive belt of claim 21, wherein the textile material takes the form of twisted yarns.

29. The drive belt of claim 21, wherein the sheet-like structure comprises cellulose and the elastic textile component and said staple fibers comprise cellulose.

30. The drive belt of claim 21, wherein said drive belt comprises an elastomeric material based on an ethylene-propylene copolymer (EPM) or an ethylene-propylene-diene copolymer (EPDM).

31. The drive belt of claim 21, further comprising an elastomeric material based on polychloroprene (CR).

32. The drive belt of claim 21, wherein the textile overlay is provided or impregnated with an adhesive.

33. The drive belt of claim 21, wherein the textile overlay is uncoated.

34. The drive belt of claim 21, wherein the textile overlay is coated.

35. The drive belt of claim 34, wherein the coating of the textile overlay is based on a sealing composition.

36. The drive belt of claim 35, wherein the sealing composition consists of an elastomeric material.

37. The drive belt of claim 36, wherein the sealing composition consists of a fluoroelastomer.

38. The drive belt of claim 21, wherein the textile overlay is provided or impregnated with a polymer solution.

39. The drive belt of claim 21, wherein the textile overlay is of a seamless configuration.

40. The drive belt of claim 21, wherein the textile overlay is impregnated with an electrically conductive adhesive or an electrically conductive polymer solution.

41. The drive belt of claim 1, wherein the textile material takes the form of twisted union yarns.

42. The drive belt of claim 1, wherein the sheet-like structure consists of: (i) cotton, cellulose, and polyurethane (PU), (ii) aramid, cellulose, and PU, or (iii) cellulose and PU.

* * * * *